United States Patent
Hiebl

(10) Patent No.: US 9,542,464 B2
(45) Date of Patent: Jan. 10, 2017

(54) METHOD FOR IDENTIFYING AND CLASSIFYING AN OBJECT

(75) Inventor: Manfred Hiebl, Sauerlach (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 271 days.

(21) Appl. No.: 13/202,265

(22) PCT Filed: Feb. 9, 2010

(86) PCT No.: PCT/DE2010/000146
§ 371 (c)(1),
(2), (4) Date: Oct. 28, 2011

(87) PCT Pub. No.: WO2010/094261
PCT Pub. Date: Aug. 26, 2010

(65) Prior Publication Data
US 2012/0054183 A1 Mar. 1, 2012

(30) Foreign Application Priority Data

Feb. 19, 2009 (DE) ........................ 10 2009 009 571

(51) Int. Cl.
*G06F 17/30* (2006.01)
*G06K 9/62* (2006.01)

(52) U.S. Cl.
CPC ....... *G06F 17/30575* (2013.01); *G06K 9/6293* (2013.01)

(58) Field of Classification Search
USPC .............................. 707/737; 706/62; 382/190
See application file for complete search history.

(56) References Cited

U.S. PATENT DOCUMENTS

| | | | |
|---|---|---|---|
| 5,247,584 A | 9/1993 | Krogmann | |
| 5,963,667 A * | 10/1999 | Hashimoto et al. | 382/190 |
| 6,178,261 B1 * | 1/2001 | Williams et al. | 382/190 |
| 6,757,668 B1 | 6/2004 | Goebel et al. | |
| 7,996,336 B2 * | 8/2011 | Parida et al. | 706/2 |
| 2002/0169730 A1 * | 11/2002 | Lazaridis | 706/20 |
| 2005/0273447 A1 * | 12/2005 | Bi | 706/12 |
| 2007/0136224 A1 * | 6/2007 | Aboutalib | 706/52 |
| 2008/0082468 A1 * | 4/2008 | Long et al. | 706/12 |
| 2008/0250002 A1 * | 10/2008 | Parida et al. | 707/4 |
| 2010/0010941 A1 * | 1/2010 | Keck | 706/12 |
| 2010/0161621 A1 * | 6/2010 | Peters | 707/749 |

FOREIGN PATENT DOCUMENTS

| | | |
|---|---|---|
| DE | 197 31 111 A1 | 1/1999 |
| DE | 197 31 111 B4 | 1/1999 |
| EP | 0 494 632 A2 | 7/1992 |

OTHER PUBLICATIONS

International Search Report with English translation dated Jul. 22, 2010 (six (6) pages).
Form PCT/ISA/237 (eight (8) pages).
Hall et al., "An Introduction to Multisensor Data Fusion", Proceedings of the IEEE, IEEE, vol. 85, No. 1, Jan. 1, 1997, pp. 6-23, XP011043797.
Vidal-Naquet et al., "Object Recognition with Informative Features and Linear Classification", Proceedings of the Ninth IEEE International International Conference on Computer Vision, Oct. 13, 2003, pp. 281-288, vol. 1, XP031213061.
Agarwal et al., "Learning a Sparse Representation for Object Detection", Proceedings of the Seventh European Conference on Computer Vision, 2002, pp. 1-8, XP002591782.
German Office Action dated Mar. 19, 2013 including English-language translation (Eleven (11) pages).

* cited by examiner

*Primary Examiner* — Sherief Badawi
*Assistant Examiner* — Christopher J Raab
(74) *Attorney, Agent, or Firm* — Crowell & Moring LLP

(57) ABSTRACT

In a method for identifying and classifying an object, an object is detected by at least one physical detector tuned for it, the object is evaluated from the output signal of the detector and by an evaluation unit, and the object is identified and/or classified on the basis of predefinable properties from the output signal. A number of different physical features of the object are derived from the output signal, and the object is assigned to one of N predetermined basic classes on the basis of the derived physical features. The N basic classes are arranged in a predetermined order to form an N-dimensional vector V, which is assigned to the object, such that the elements $v_1, \ldots, v_N$ of the vector V indicate that the object belongs to the respective basic class. The object is then assigned to a derived class, which is taken from a reference data base, as a function of the vector V.

2 Claims, No Drawings

METHOD FOR IDENTIFYING AND CLASSIFYING AN OBJECT

BACKGROUND AND SUMMARY OF THE INVENTION

This invention is directed to a certain method for identifying and classifying an object.

Within the context of the invention, an object is defined by way of an output signal of a detector, which output signal exceeds a predefinable threshold value from an acoustic or optical detector or a radar detector (radar system) or a combination of such detectors.

German document DE 197 31 111 B4 describes a known method for identifying and classifying an object. In this method, the object is identified and/or classified on the basis of predefinable properties from an output signal as well as a vectorial arrangement.

The method disclosed in German document DE 197 31 111 B4 is based on the use of indicators that are largely independent of the output signals of the physical detectors used. An indicator is an abstract term for a predefinable property and/or a predefinable behavior of an actual object, for example an aircraft or a ship, which is detected by at least one detector, for example, a radar system tuned to it. An indicator is thus an abstract term for a predefinable qualitative and quantitative item of information, which is relevant for identification purposes. A trend is then assigned to each indicator, corresponding to the basic identity of the indicator. The indicators are then represented as vectors in a multidimensional vector space.

Identification of objects by this method is very computation intensive because it involves a multidimensional vector space.

The problem addressed by the present invention is to provide a method that can be implemented in a less computation-intensive manner, and therefore more rapidly, than with the state of the art.

This problem is solved by the process steps claimed. Advantageous embodiments are also claimed.

DETAILED DESCRIPTION OF THE INVENTION

According to the invention, a number of different physical features are derived from the output signal of the detector or detectors. The object is next assigned to at least one of N predetermined basic classes on the basis of the derived physical features. The N basic classes are arranged in a predetermined sequence to form an N-dimensional vector V, which is assigned to the object. The elements $v_1, \ldots, v_N$ of the vector V indicate that the object belongs to the respective basic class. The object is then identified by assigning the object to a derived class, depending on the vector V, such that the derived class is stored in a reference database and is removed from this database.

An object will be investigated for several of its physical properties, for example 8 to 12 properties. An object is essentially defined as a simply cohesive region having defined physical properties which differentiate it unambiguously from other objects. These physical properties may be, for example, the edge properties, the surface property, interfaces, or extent of the object.

On the basis of the physical properties investigated and ascertained, the object is divided into a number N of predetermined basic classes. An object may be assigned to one or more basic classes. The basic classes may be, for example, the class of radar sources, the class of transmission sources, the class of heat sources, the class of objects with a radar backscatter cross section, the class of objects causing a Doppler effect, the class of light-emitting objects, the class of spectral objects, the class of sound sources or the class of contour targets. The invention may of course also be expanded to include additional basic classes.

For each object, the N basic classes are arranged in a predetermined order to form an N-dimensional vector V. The elements of the vector V are $v_1, \ldots, v_N$. Thus a basic class is assigned to each vector element $v_1, \ldots, v_N$ in a fixedly predetermined order. The individual elements $v_1, \ldots, v_N$ of the vector V provide information about whether or not the respective object belongs to the corresponding basic class.

In an advantageous embodiment of the invention, depending on the object's membership in the corresponding basic class, the binary value 1 or 0 is assigned to the vector element $v_1, \ldots, v_N$. The binary value 1 is assigned to a vector value $v_1, \ldots, v_N$ when the object belongs to the basic class assigned to the respective vector element $v_1, \ldots, v_N$.

Thus a code which is typical of the respective target is assigned to each object by the vector elements $v_1, \ldots, v_N$ of the vector V. Using these codes, the object can be assigned to a derived class. By comparing the vector V and thus the code with corresponding entries in a reference database, the object can be identified unambiguously.

For example, "passenger vehicle," "aircraft defense systems," "power plant," and "radio transmitter" may expediently be defined as derived classes. The following table shows the entries of vector V for various basic classes and derived classes as examples:

| | Derived classes | | | |
|---|---|---|---|---|
| Basic class | Passenger vehicle | Aircraft defense system | Power plant | Radio transmitter |
| Radar source | 0 | 1 | 0 | 0 |
| Radio source | 0 | 0 | 0 | 1 |
| Heat source | 1 | 1 | 1 | 0 |
| RCS source | 1 | 1 | 1 | 1 |
| Doppler source | (1 or 0) | (0 or 1) | 0 | 0 |
| Light source | 1 | 0 | 1 | 0 |
| Color source | 1 | 0 | 0 | 1 |
| Sound source | 1 | 1 | 1 | 0 |
| Contour | 1 | 1 | 1 | 1 |

The information in the table above is given only as an example and does not constitute a closed set of targets to be identified. Aircraft defense systems are evaluated in the preceding example as a sound source because a noise may be produced by the outgoing rockets. However, it is also possible with aircraft defense systems to allow a 0 for sound source when the status of the aircraft defense system is considered, with 1 for aircraft defense system in operation, i.e., rocket is fired and 0 for standby mode.

Radio transmitters are identified in the preceding as a color source because radio transmitters usually have antenna towers that are labeled in colors. Furthermore the towers have a characteristic shape, e.g., obelisk or parabolic shape.

The table above shows that the binary sequence of the individual derived classes formed by the basic classes are different. For example, it is not out of the question for the binary sequence of a passenger vehicle to be identical to the binary sequence of a radio transmitter.

Using the inventive method, objects can be recognized on the basis of the existence or nonexistence of features. The following table shows the case of differentiating between two objects on the basis of a feature. This feature is either present (1) or not present (0). On the whole, this yields $2^2=4$ combinations of features. The probability that two objects will be identical in one feature is $2^{-1}$, i.e., 50%.

| Case | Target 1 Feature | Target 2 Feature |
|---|---|---|
| 1 | 1 | 1 |
| 2 | 1 | 0 |
| 3 | 0 | 1 |
| 4 | 0 | 0 |

With two differentiating features, a total of $2^4=16$ combinations of features are thus possible. The probability that two objects will be identical in two features is thus $2^{-2}$, i.e., 25%.

Consequently, with N differentiating features, $2^{2N}$ combinations of features are possible. The probability W that two objects will be identical in N features is thus $2^{-N}$, i.e., $\lim W(N \to \infty)=0$.

Using the inventive method, several physical features of the found object and the sought object are analyzed and compared. The reliability of the information depends on the number of features analyzed. If an object cannot be ruled out as the sought object of a basic class and/or of a derived class on the basis of the features analyzed, then at the same time it is highly unlikely that another object will coincidentally have the same combination of features and will also be considered as the sought object. In other words, once an object is classified on the basis of its features as a passenger vehicle, for example, it is highly unlikely that a building will have the same combination of features.

The advantage of present invention is that a system executing the method need not be trained separately because the object classes (=derived classes) for which a search is to be conducted are known a priori due to their very specific coding. Another advantage of this invention is that the result depends essentially on a sequence of logic ones and zeros. Therefore, the data volume to be evaluated is greatly reduced.

The inventive method is particularly suitable for unmanned autonomous systems flying in formation.

The invention claimed is:

1. A method for identifying and classifying a physical object based on detected physical features of the object, comprising:

providing a multitude of derived object classes, each of which relates to a specific physical object, wherein each derived object class is an N-dimensional vector comprising multiple binary values and each binary value is assigned to a physical features and indicates whether or not the assigned physical feature is characteristic for the physical object of the respective derived object class;

after provision of the multitude of derived object classes, initiating the following steps:

detecting one or more physical features of the physical object by at least one physical detector tuned for the object, and identifying the object using an output signal of the at least one detector by:
  (i) determining, using the output signal, whether the detected object possess any of a plurality of pre-defined physical features,
  (ii) assigning a binary value to each of N predetermined basic classes based on the determination of whether the detected object possess any of the plurality of predefined physical features, wherein the binary values indicates whether or not the detected object possesses each of the plurality of predefined physical features,
  (iii) arranging the binary values for the N basic classes in a predetermined order to form a detected object class which is an N-dimensional vector V, wherein the detected object class is of a similar structure as a derived object class, and
  (iv) classifying the object by comparing (a) the binary values for the N basic classes of the detected object with (b) binary values for the N basic classes for the plurality of derived object classes obtained from a database, wherein each of the derived object classes corresponds to a pre-assigned object, and wherein when the binary values for the N basic classes of the detected object match the binary values for the N basic classes of one of the plurality of derived object classes the detected object is identified as that object being pre-assigned to the matching one of the plurality of derived object classes.

2. The method according to claim 1, wherein the basic classes are radar source, transmission source, heat source, radar backscatter source, Doppler effect, light source, spectral source, sound source, and contour classes.

* * * * *